US 9,358,885 B2

(12) United States Patent
Bowers

(10) Patent No.: US 9,358,885 B2
(45) Date of Patent: Jun. 7, 2016

(54) VARIABLE RATIO THROTTLE PEDAL

(71) Applicant: HONDA MOTOR CO., LTD., Tokyo (JP)

(72) Inventor: Lee N. Bowers, Springfield, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 157 days.

(21) Appl. No.: 14/444,492

(22) Filed: Jul. 28, 2014

(65) Prior Publication Data
US 2016/0023551 A1 Jan. 28, 2016

(51) Int. Cl.
*G05G 1/30* (2008.04)
*B60K 26/02* (2006.01)

(52) U.S. Cl.
CPC . *B60K 26/02* (2013.01); *G05G 1/30* (2013.01)

(58) Field of Classification Search
CPC ...... B60K 26/02; B60K 26/021; B60K 26/04; G05G 1/30; G05G 1/305; G05G 1/34; G05G 1/36; G05G 1/46; Y10T 74/20534
See application file for complete search history.

(56) References Cited

U.S. PATENT DOCUMENTS

| 3,435,165 A * | 3/1969 | Lombard | B60K 26/02 200/276 |
|---|---|---|---|
| 3,446,091 A * | 5/1969 | Stocker | B60K 26/02 74/513 |
| 4,429,589 A | 2/1984 | Stocker | |
| 4,779,480 A | 10/1988 | Stocker | |
| 4,800,773 A * | 1/1989 | Nakamura | B60K 26/02 74/500.5 |
| 5,771,752 A * | 6/1998 | Cicotte | G05G 1/405 74/512 |
| 5,970,817 A | 10/1999 | Ichiba | |
| 5,996,438 A | 12/1999 | Elton | |
| 6,263,758 B1 | 7/2001 | Kumamoto et al. | |
| 6,564,672 B2 | 5/2003 | Brock et al. | |
| 6,666,105 B2 | 12/2003 | Wachi | |
| 6,701,799 B2 | 3/2004 | Cicotte | |
| 6,918,318 B2 | 7/2005 | Willemsen | |
| 7,421,927 B2 | 9/2008 | Terradas et al. | |
| 8,751,126 B2 * | 6/2014 | Sakaguchi | B60K 26/021 701/70 |
| 8,844,401 B2 * | 9/2014 | Sakaguchi | F02D 11/02 701/70 |
| 2014/0000408 A1 | 1/2014 | Saito et al. | |

FOREIGN PATENT DOCUMENTS

JP 2234848 A 9/1990

* cited by examiner

*Primary Examiner* — Adam D Rogers
(74) *Attorney, Agent, or Firm* — Kenealy Vaidya LLP

(57) ABSTRACT

A pedal assembly includes a one-piece accelerator pedal without moving linkages that is mounted to a pin for rotational movement relative to a mounting stay. The throttle cable is operatively connected to the accelerator pedal for movement thereby as the pedal rotates, at least one of the pedal and mounting stay configured to provide a first ratio of pedal stroke movement relative to cable stroke movement at initial depression of the accelerator pedal, and a different, second ratio of pedal stroke movement relative to cable stroke movement upon further depression of the accelerator pedal.

15 Claims, 7 Drawing Sheets

VARIABLE RATIO THROTTLE PEDAL

BACKGROUND

The present disclosure relates to a throttle or accelerator pedal, and an associated method of developing more holding power resulting from simultaneously depressing a brake pedal and a throttle pedal by modifying a ratio of the throttle pedal. It finds particular application in conjunction with a variable ratio throttle pedal. However, it is to be appreciated that the present exemplary embodiment is also amenable to other like applications that encounter similar problems or require similar solutions.

Currently, an accelerator pedal is pivotally moved relative to a mount or mounting stay. A throttle cable is, in turn, secured to the accelerator pedal so that pulling of the throttle cable matches the movement of the accelerator pedal. That is, the cable stroke or cable pull ratio matches the ratio of pedal stroke movement throughout the actuation/deactuation of the pedal. There is only a small incidental variation in the ratio so that the cable pull ratio is dictated by the accelerator pedal ratio. Typically, a line of action for the cable is aligned with a top of the accelerator pedal. The intent is to maintain a linear accelerator pedal input and as a result the cable end follows an arc controlled by a pivot location of the pedal. This ensures minimal change to the pedal to cable stroke ratio.

It is desirable to assure that brake force builds faster than engine torque when both brake and accelerator pedals are simultaneously depressed. Variable ratio throttle systems are per se known. The change in rate, however, is usually practical due to the environment the pedals are subjected to. For example, water, ice, mud, etc. could potentially lodge in the cam and as a result the throttle cable would become dislodged from its desired line of action. Thus, a simplified structure that assures that opening of an engine throttle is slower than application of the brake is required. Also, with a variable ratio pedal, is desirable that the operator/driver not detect the slower action of the accelerator at small pedal angles and assure that action of the accelerator at normal driving modes be in the range of traditional or more normal pedal to cable pull ratios.

This disclosure remedies these problems in a simple, reliable, effective, and inexpensive manner.

BRIEF DESCRIPTION

There is provided a pedal assembly, namely an accelerator pedal assembly, in which a throttle cable attaches to an accelerator pedal at an angle so that the throttle cable provides a variable angle as the pedal is actuated or depressed, and wherein the pedal is a one-piece member without moving linkages to provide the variable angle.

More particularly, the pedal assembly includes a mounting stay and a pin fixedly secured to the mounting stay. The one-piece accelerator pedal without moving linkages is mounted to the pin for rotational movement about the pin relative to the mounting stay. The throttle cable is operatively connected to the accelerator pedal for movement thereby as the pedal rotates, at least one of the pedal and mounting stay configured to provide a first ratio of pedal stroke movement relative to cable stroke movement at initial depression of the accelerator pedal, and a different, second ratio of pedal stroke movement relative to cable stroke movement upon further depression of the accelerator pedal.

The throttle cable is secured to the accelerator pedal for initial movement at an angle relative to a tangent of the pedal travel path.

The angle ranges from approximately 45° to approximately −7° relative to the tangent of the pedal travel path.

The throttle cable is substantially tangent to the pedal travel path at the end of the cable stroke.

The mounting stay includes a mounting region that receives the throttle cable and orients the throttle cable substantially perpendicular to an initial portion of the angled pedal travel path.

The accelerator pedal includes a mounting region that receives a first end of the throttle cable.

The pedal assembly further includes a brake pedal assembly that is configured to provide a brake force that is greater than an engine torque.

The brake force is greater than the engine torque during the first ratio of pedal stroke movement relative to cable stroke movement at initial depression of the accelerator pedal.

A method of varying a ratio of pedal stroke movement relative to cable stroke movement during actuation of an accelerator pedal includes mounting an accelerator pedal to a pin for rotational movement about the pin. The method further includes connecting a throttle cable to the accelerator pedal for movement in different first and second ratios of pedal stroke to cable stroke movement during actuation of the accelerator pedal.

The method includes securing the throttle cable to the accelerator pedal for initial movement at an angle relative to a tangent of the pedal travel path.

The method includes providing a first ratio of pedal stroke movement relative to cable stroke movement at initial depression of the accelerator pedal, and a different, second ratio of pedal stroke movement relative to cable stroke movement upon further depression of the accelerator pedal.

The method includes providing a greater ratio of pedal stroke movement relative to cable stroke movement during initial depression of the accelerator pedal than later in the pedal stroke movement.

The method includes providing greater braking force than engine torque during the first ratio of pedal stroke movement relative to cable stroke movement at initial depression of the accelerator pedal.

The method includes forming the pedal as a one-piece component without moving linkages.

One benefit of the present disclosure is assuring that the brake force builds faster than the engine torque when both brake and accelerator pedals are simultaneously depressed.

Yet another advantage is the ability to address this issue without substantially altering the remaining components of the current system.

Still another benefit is the simple, less complex manner of achieving a variable ratio throttle/accelerator pedal assembly.

Still other benefits and advantages will become apparent those skilled in the art after reading and understanding the following detailed description.

DETAILED DESCRIPTION

Figure 1:
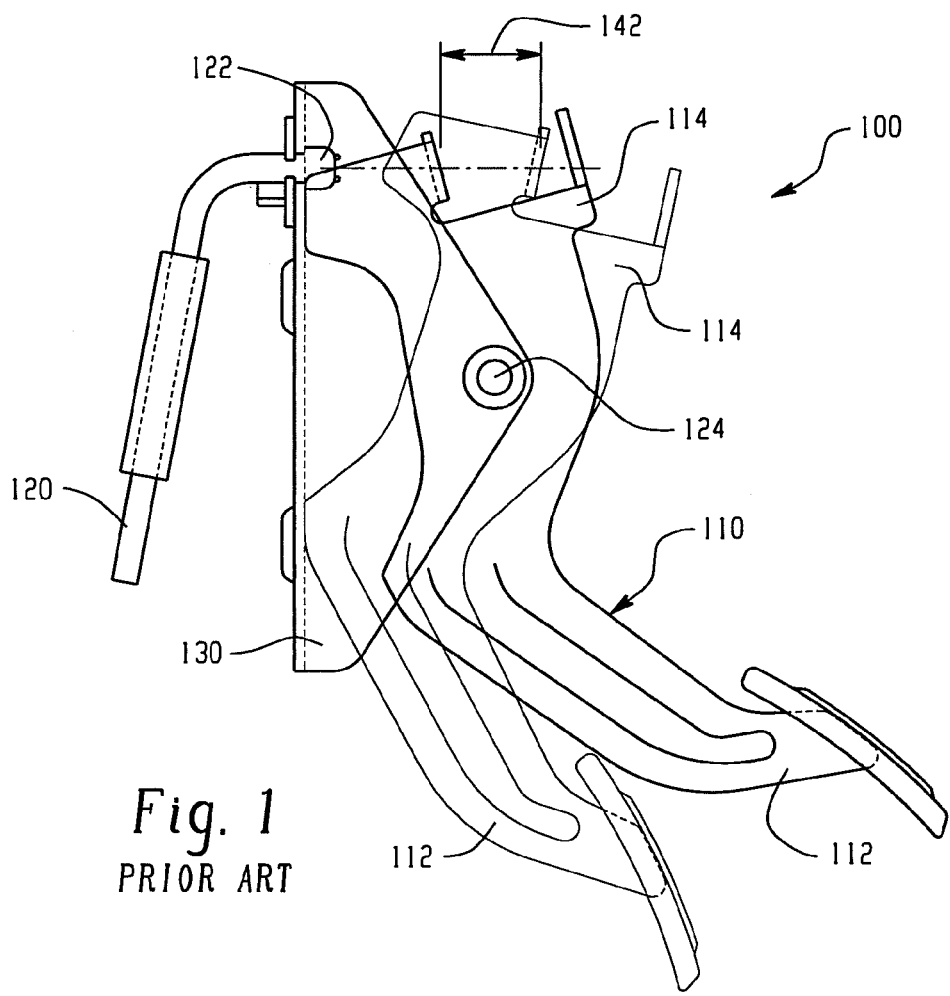
FIG. 1 is a schematic elevational view of an accelerator pedal assembly known in the art.

The description and drawings herein are merely illustrative, and various modifications and changes can be made in the structures disclosed without departing from what is defined in the appended claims. All references to direction and position, unless otherwise indicated, refer to the orientation of the structures and components illustrated in the drawings and should not be construed as limiting the claims appended hereto. Like numbers refer to like parts throughout the several views.

With reference to FIG. 1, there is shown a pedal assembly 100 such as used in an associated vehicle (not shown). In this particular instance, the pedal assembly 100 is an accelerator pedal assembly which includes an accelerator pedal 110 having a first arm or portion 112 through which a force is applied to the pedal, e.g. through application of a force via the foot of the vehicle user, and a second arm or portion 114 that connects with an accelerator or throttle cable 120, particularly a first end thereof. The pedal 110 is mounted for rotation on pin 124 that is secured to a mounting surface or mounting stay 130. The mounting stay 130 is commonly secured to a firewall or panel (not shown) in a manner generally known in the art so that it is common for the mounting stay to be secured to a substantially vertical wall of the vehicle. The pin 124 is thus disposed in spaced relation relative to this vehicle wall and allows pivotal movement of the pedal 110.

Figure 2:
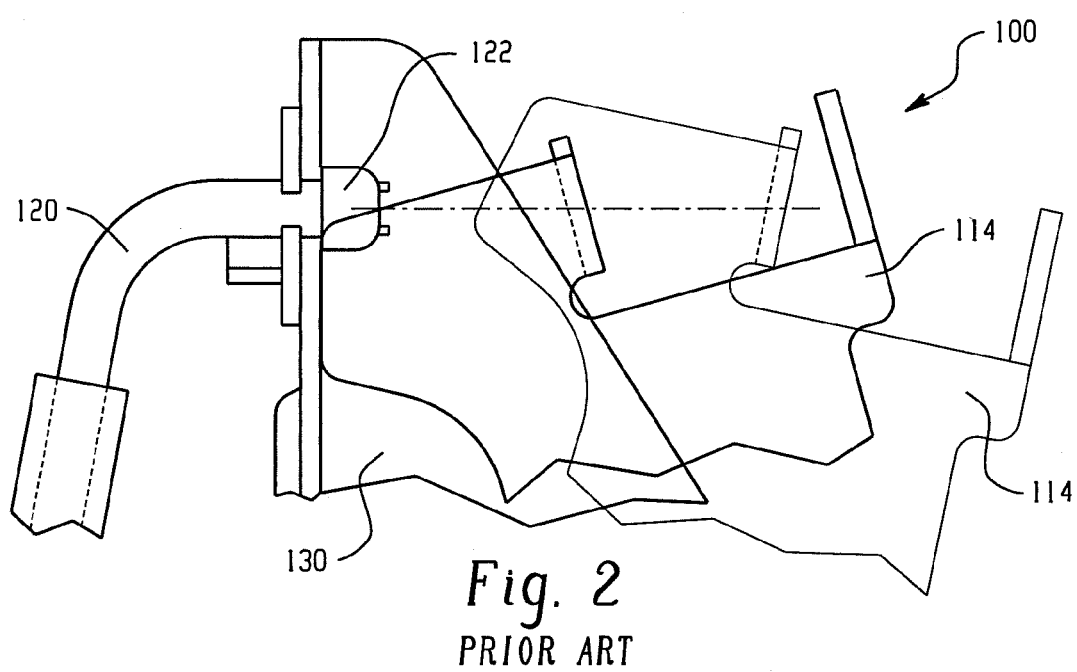
FIG. 2 is an enlarged detail view of a portion of FIG. 1.

Applying a force through the first arm 112 rotates the pedal 110 around the pin 124 (in a clockwise direction as shown) and likewise results in the same rotational movement of the second arm 114 (again, in the clockwise direction as shown). As a result of the rotational movement, the first end 122 of the throttle cable 120 is pulled as the accelerator pedal 110 rotates about the pin 124. As shown in FIGS. 1 and 2, the full extent of rotation of the pedal 110 is illustrated by the two positions of the pedal.

Figure 3:
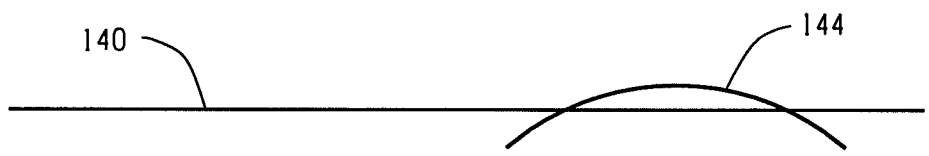
FIG. 3 is a representation of a line of action of a throttle cable associated with the arrangement of FIGS. 1 and 2.

The first end 122 of the throttle cable 120 travels along a substantially linear path 140 as the pedal is actuated (FIG. 3). This travel is also represented in FIG. 1 by reference numeral 142 as a stroke length or pull distance of the throttle cable 120. The throttle cable end 122 follows arc 144 (FIG. 3) controlled by the pin 124 or pedal pivot location. This has a minimal change to the pedal to cable stroke ratio. The line of action for the throttle cable 120 is aligned with the top of the accelerator pedal 110, i.e., with the top of the second portion 114 of the accelerator pedal 110. Although there may be a small variation in the ratio, the design intent with the current technology is to maintain a linear accelerator pedal input. Thus, the cable pull ratio traditionally matches the top of the accelerator pedal 110, and there is only a small incidental variation in the ratio, so the cable pull ratio is driven by the pedal ratio. This is represented by a linear plot 146 in FIG. 4.

Where the accelerator pedal 110, 1120 and the brake pedal 100 are depressed at the same time, i.e. simultaneously, it is desirable that the vehicle not move. Therefore, it is desirable that the engine throttle opening is slower than the brake application. It becomes necessary to design the brake force to increase faster than the engine torque when both brake and accelerator pedals are depressed at the same time. This can be achieved with a variable ratio accelerator pedal, one output of which is illustrated by plot 150 in the graphical representation of FIG. 4. As mentioned in the Background, it is preferable to limit the complexity and number of changes to incorporate a variable ratio accelerator pedal. To that end, a new pedal assembly 200, 1100 is shown in FIGS. 5-11 in order to achieve the variable ratio, preferably a first ratio 152 where there is an increased or greater pedal stroke relative to cable stroke through an initial portion of accelerator pedal depression, and then a second ratio 154 shown in FIG. 4 as having the same ratio as that of the prior art arrangement of FIGS. 1-3. Of course the particularly selected ratio may vary without departing from the scope and intent of the present disclosure, although these are preferred ratios.

Reference numerals in the "100 series" (such as pedal assembly 100 in FIGS. 1-3) now identify like components by reference numerals in the "200 series" (such as pedal assembly 200 in FIGS. 5-11), and new components are also referenced by new numerals in the 200 series. Here, pedal assembly 200 is an accelerator pedal assembly which includes an accelerator pedal 210 having a first arm or portion 212 (through which a force is applied to the pedal) and a second arm or portion 214 that connects with an accelerator/throttle cable 220, particularly a first end 222 thereof. The one-piece pedal 210 is mounted for rotation on pin 224 that is secured to a mounting surface or mounting stay 230. The mounting stay 230 is secured to a firewall or panel (not shown) and the pin 224 allows pivotal movement of the pedal 210. Rotation of the first arm 212 rotates the pedal 210 around the pin 224 (in a clockwise direction as shown) and likewise results in the same rotational movement of the second arm 214 (again, in the clockwise direction as shown).

Figure 4:
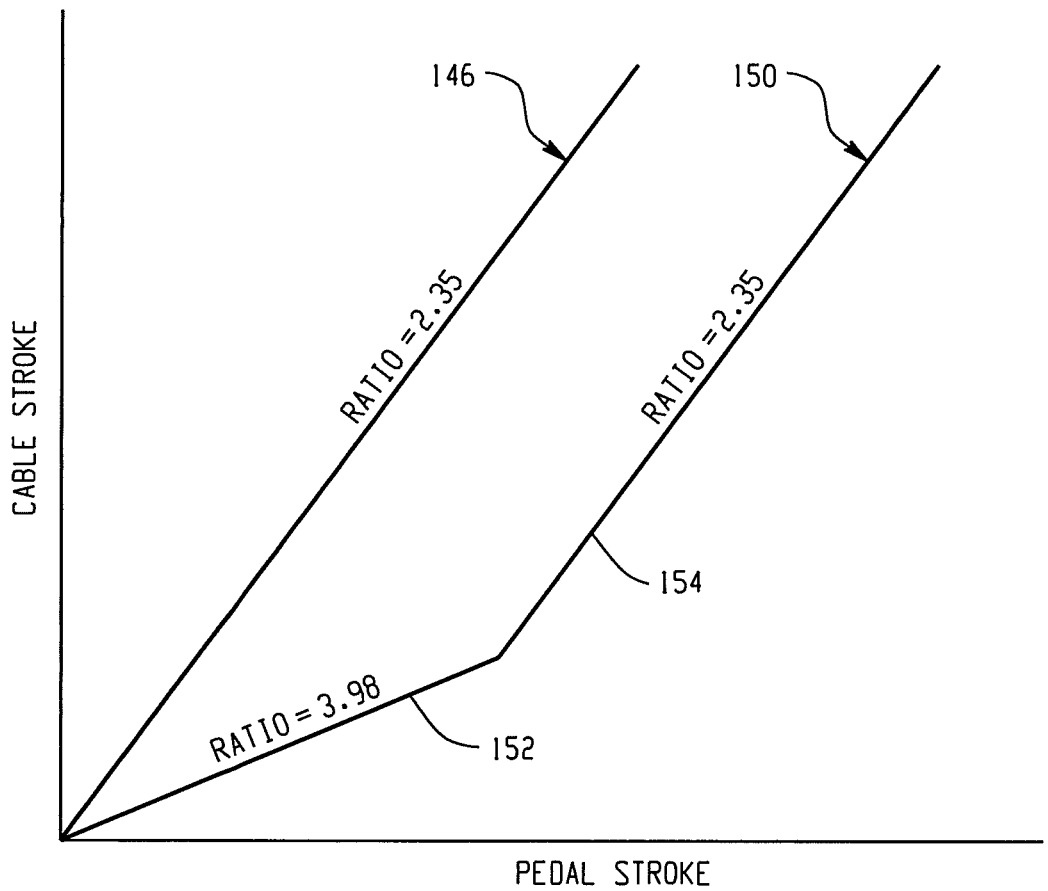
FIG. 4 is a graphical representation of pedal stroke versus cable stroke/pull.
Figure 5:
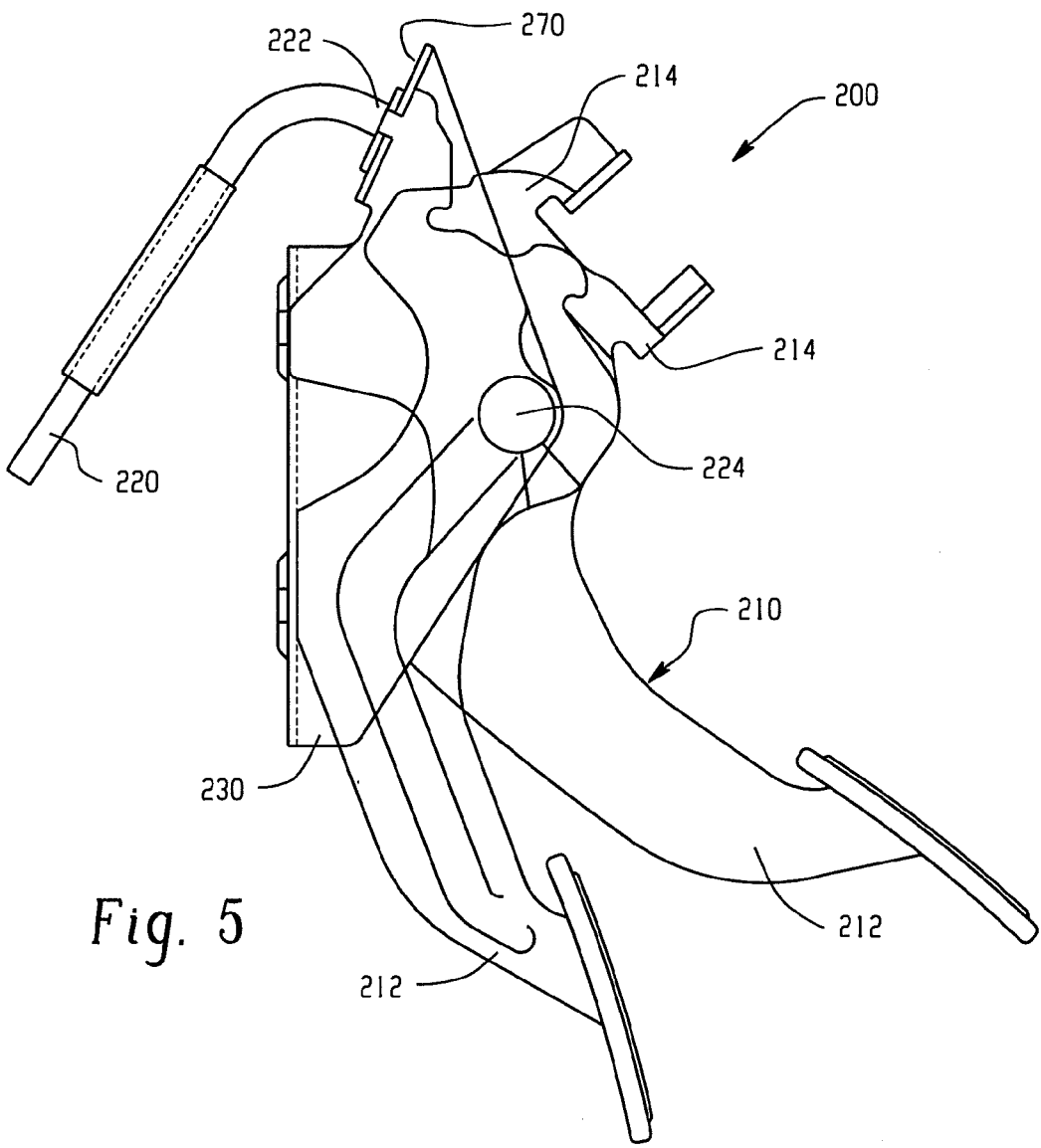
FIG. 5 is a schematic elevational view of an accelerator pedal assembly of the present disclosure.
Figure 6:
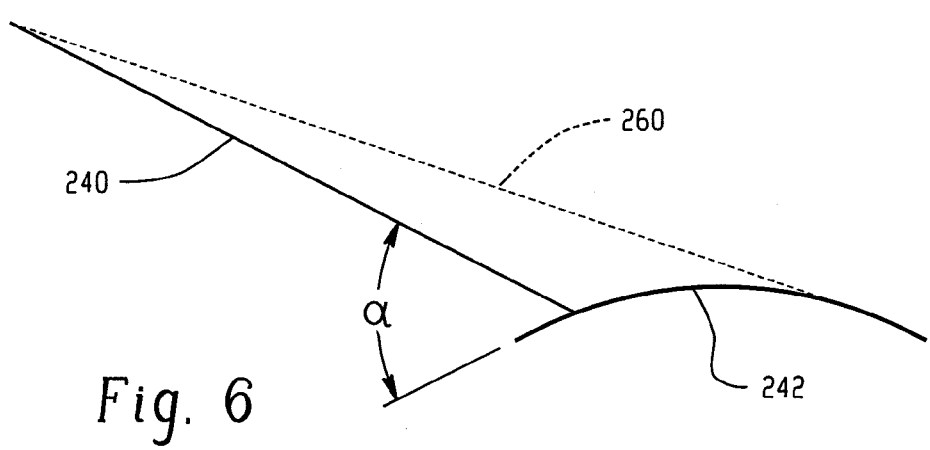
FIG. 6 is a representation of a line of action of the throttle cable associated with the accelerator pedal assembly of FIG. 5.
Figure 7:
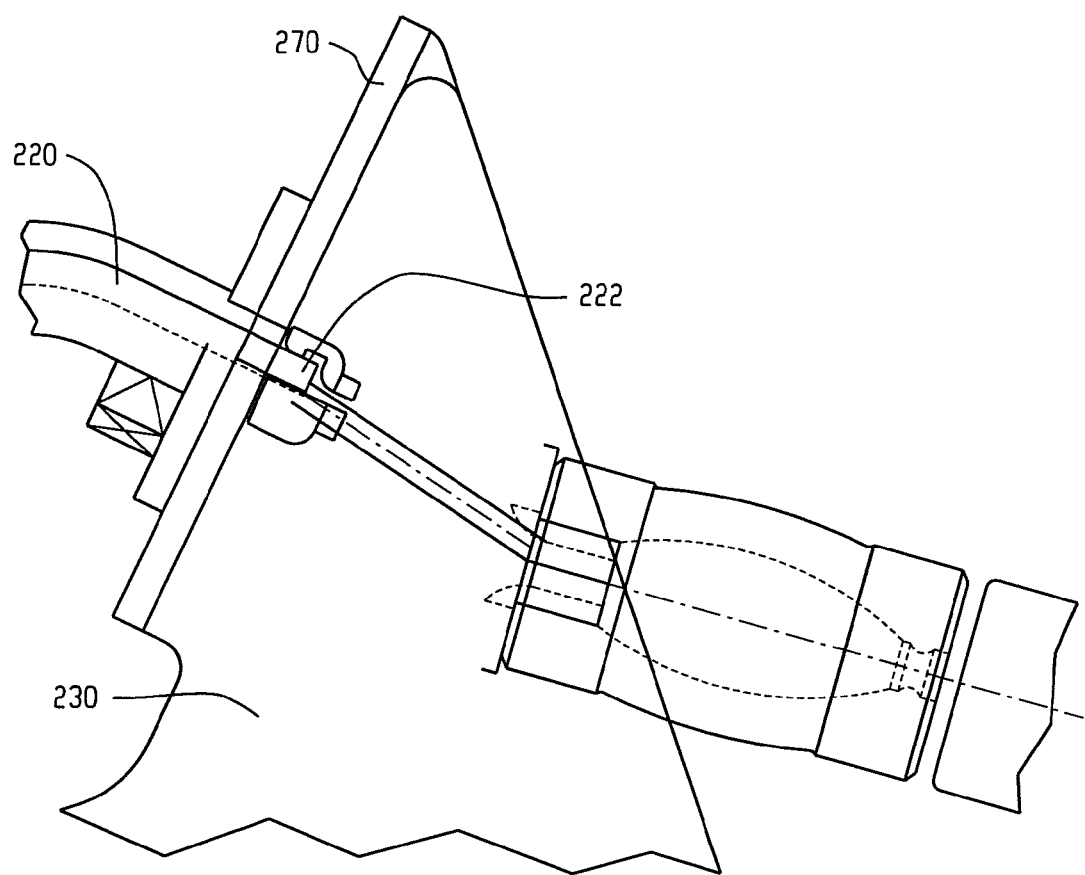
FIG. 7 is an enlarged detail view of a portion of FIG. 5.
Figure 8:
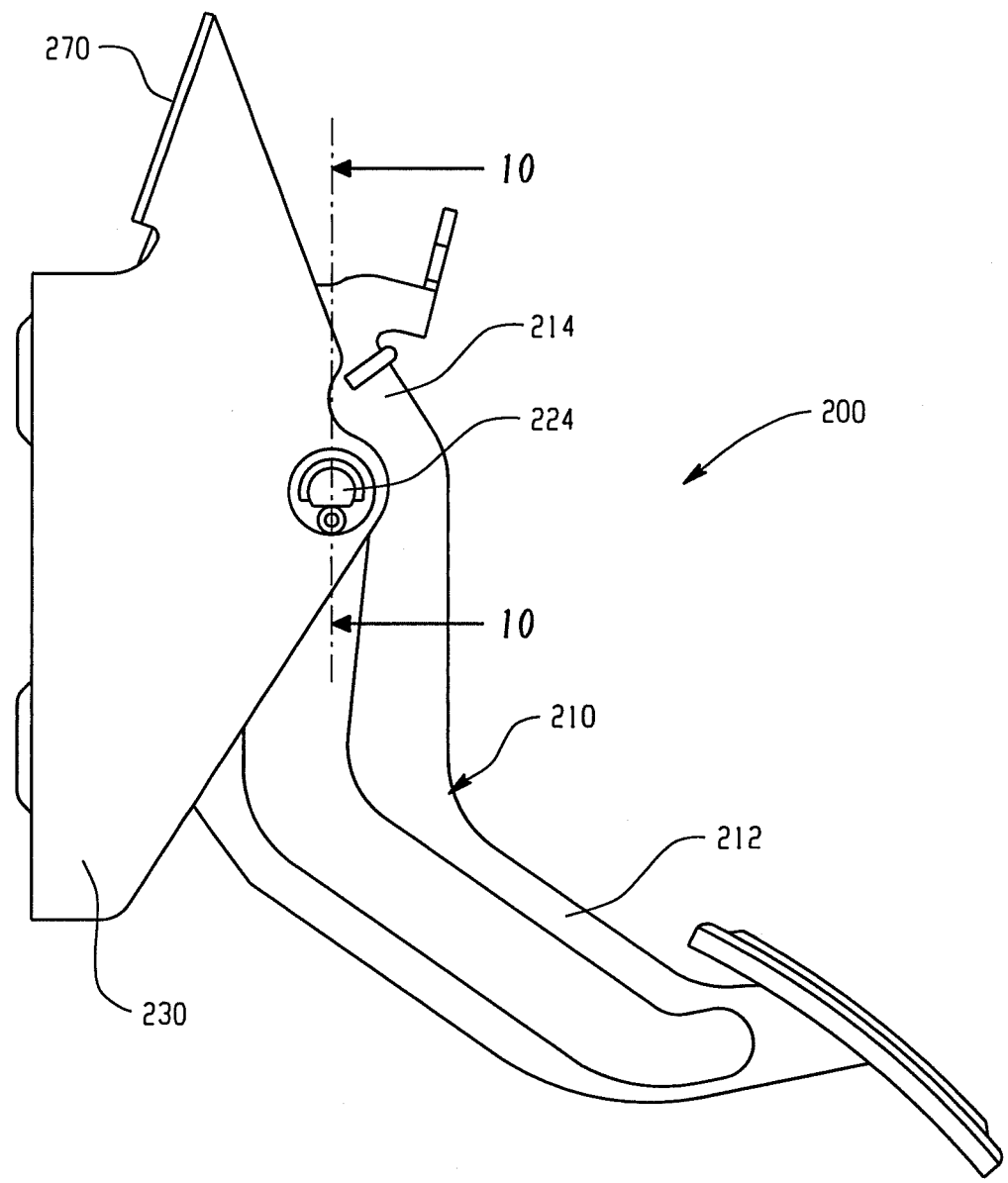
FIG. 8 is a schematic elevational view of a mounting stay and accelerator pedal.
Figure 9:
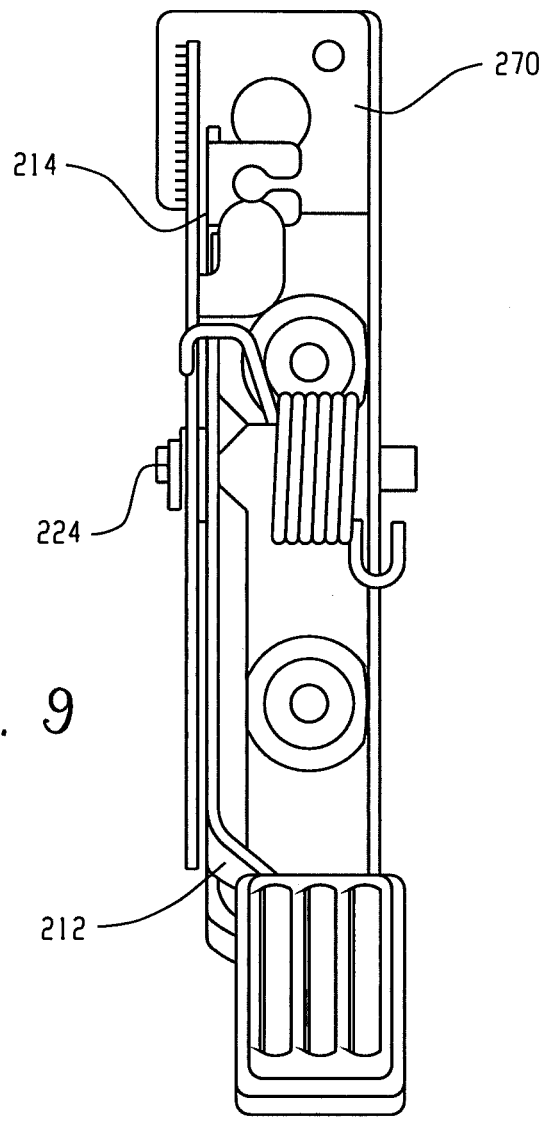
FIG. 9 is an elevational view taken generally from along the right-hand side of FIG. 8.
Figure 10:
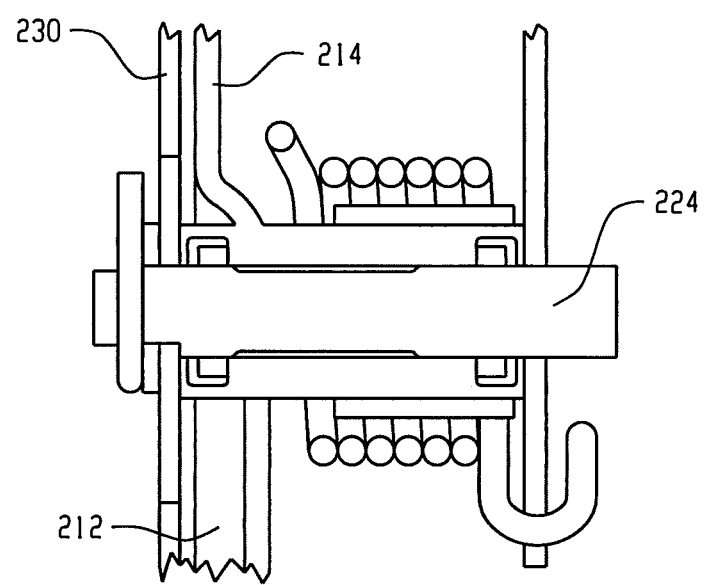
FIG. 10 is an enlarged cross-sectional view taken generally along the lines 10-10 of FIG. 8.
Figure 11:
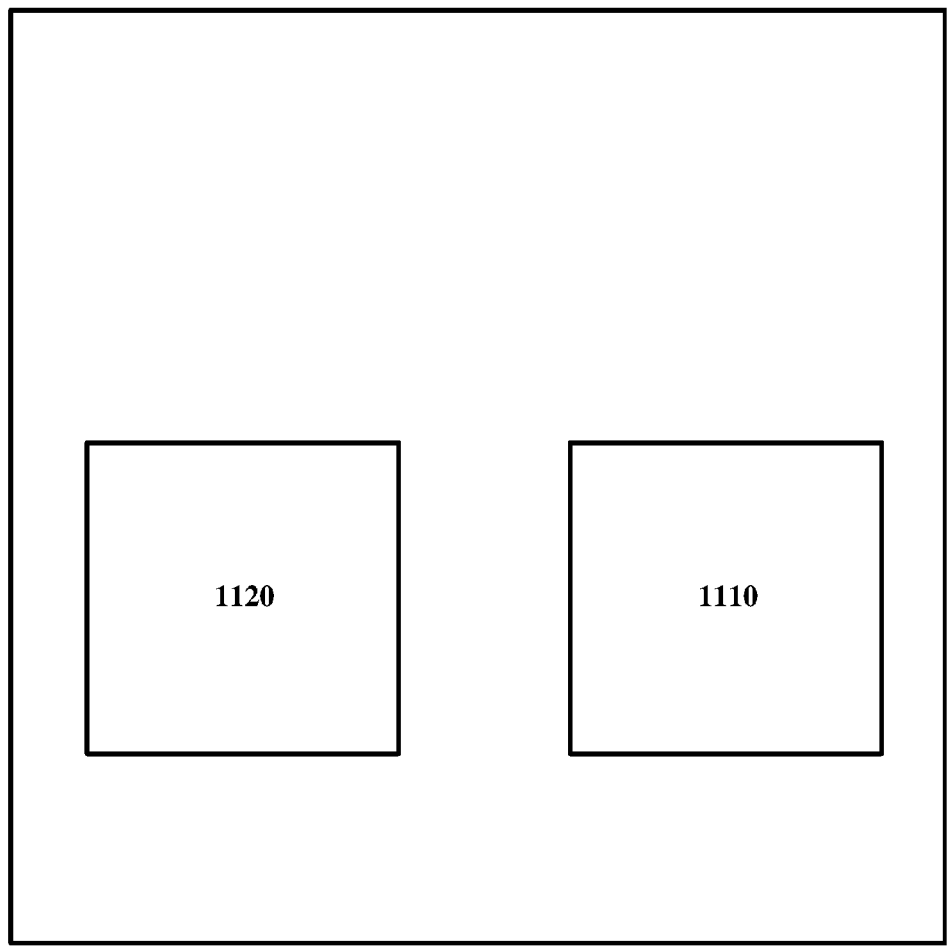
FIG. 11 is a schematic of a brake pedal assembly including a brake pedal.

As a result of the rotational movement, the first end 222 of the throttle cable 220 is pulled as the accelerator pedal 210 rotates about the pin 224. The first end 222 of the throttle cable 220 travels along a path 240 (FIG. 6) when the accelerator pedal 210 is actuated and this path is initially oriented at an angle "α" relative to the arc stroke or movement 242 of the accelerator pedal. By way of example, angle α may range from approximately 45° (for instance as shown in FIG. 6) to approximately −7°. At the end of the stroke, the throttle cable 220 is virtually tangent (see reference numeral 260 in FIG. 6) to the arc stroke 242 of the accelerator pedal 210. Thus, the ratio of the pedal stroke to the cable stroke varies as illustrated in FIG. 4, from an initial ratio 152 to a second ratio 154. Consequently, the cable pull ratio 152 transitions to a second ratio 154 resulting from the purposeful, initial positioning of the throttle cable 220 at an angle α to the arc path of the pedal 210 that then transitions to become tangent with the arc path of the accelerator pedal.

In this manner, where the accelerator pedal 210, 1120 and the brake pedal 1110 are depressed at the same time, i.e. simultaneously, the engine throttle opening is initially and desirably slower than the brake application. The new pedal assembly 200 effectively achieves the desired variable ratio by angling a surface 270 of the mounting stay that is oriented perpendicular to the initial path 240 defined by angle a. If the angle a is changed, then likewise the angle of surface 270 is altered to provide proper orientation of the throttle cable end 222 with accelerator pedal 210.

Preferably the pedal 210 is a one-piece member without moving linkages. This eliminates undesired complexity, yet purposeful angling of the throttle cable 220 at the attachment point 222 with the accelerator pedal 210 still provides the desired variable ratio. This is also accomplished in a manner that does not require undue alteration of surrounding components in an existing vehicle design.

This written description uses examples to describe the disclosure, including the best mode, and also to enable any person skilled in the art to make and use the disclosure. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Moreover, this disclosure is intended to seek protection for a combination of components and/or steps and a combination of claims as originally presented for examination, as well as seek potential protection for other combinations of components and/or steps and combinations of claims during prosecution.

What is claimed is:

1. A pedal assembly comprising:
a mounting stay;
a pin fixedly secured to the mounting stay;
a one-piece accelerator pedal without moving linkages mounted to the pin for rotational movement about the pin relative to the mounting stay; and
a throttle cable operatively connected to the accelerator pedal for movement thereby as the accelerator pedal rotates, at least one of the accelerator pedal and the mounting stay configured to provide a first ratio of pedal stroke movement relative to cable stroke movement at initial depression of the accelerator pedal, and a different, second ratio of pedal stroke movement relative to cable stroke movement upon further depression of the accelerator pedal, wherein
the throttle cable is secured to the accelerator pedal for initial movement at an angle relative to a tangent of a pedal travel path, and the angle ranges from approximately 45° to approximately −7° relative to the tangent of the pedal travel path.

2. The pedal assembly of claim 1 wherein the throttle cable is tangential to the pedal travel path at the end of the cable stroke.

3. The pedal assembly of claim 1 wherein the mounting stay includes a mounting region that receives the throttle cable and orients the throttle cable substantially perpendicular to an initial portion of the pedal travel path.

4. The pedal assembly of claim 1 wherein the accelerator pedal includes a mounting region that receives a first end of the throttle cable.

5. The pedal assembly of claim 1 further comprising a brake pedal assembly that is configured to provide a brake force that is greater than an engine torque.

6. The pedal assembly of claim 5 wherein the brake force is greater than the engine torque during the first ratio of pedal stroke movement relative to cable stroke movement at initial depression of the accelerator pedal.

7. A pedal assembly comprising:
a mounting stay;
a pin secured to the mounting stay;
an accelerator pedal mounted to the pin for rotational movement about the pin relative to the mounting stay;
a throttle cable operatively connected to the accelerator pedal for movement thereby as the accelerator pedal rotates, at least one of the accelerator pedal and mounting stay configured to provide a first ratio of the accelerator pedal stroke movement relative to cable stroke movement at initial depression of the accelerator pedal, and a different, second ratio of the accelerator pedal stroke movement relative to cable stroke movement upon further depression of the accelerator pedal;
a mounting region on the mounting stay that receives the throttle cable and orients the throttle cable substantially perpendicular to an initial portion of an angled travel path of the accelerator pedal; and
a brake pedal assembly that is configured provide a brake force that is greater than an engine torque; wherein
the brake force is greater than the engine torque during the first ratio of pedal stroke movement relative to cable stroke movement at initial depression of the accelerator pedal.

8. The pedal assembly of claim 7, wherein the throttle cable is secured to the accelerator pedal for initial movement at an angle relative to a tangent of the angled travel path.

9. The pedal assembly of claim 8 wherein the angle ranges from approximately 45° to approximately −7° relative to the tangent of the angled travel path.

10. The pedal assembly of claim 7 wherein the throttle cable is tangential to the pedal travel path at the end of the cable stroke.

11. A method of varying ratios of pedal stroke movement relative to cable stroke movement during actuation of an accelerator pedal comprising:
mounting the accelerator pedal to a pin for rotational movement about the pin;
connecting a throttle cable to the accelerator pedal for movement in different first and second ratios of pedal stroke to cable stroke movement during actuation of the accelerator pedal; and
providing a greater braking force than engine torque during the first ratio of pedal stroke movement relative to cable stroke movement at initial depression of the accelerator pedal.

12. The method of claim 11 further including securing the throttle cable to the accelerator pedal for initial movement at an angle relative to a tangent of a pedal travel path.

13. The method of claim 11 further including providing the first ratio of pedal stroke movement relative to cable stroke movement at initial depression of the accelerator pedal, and the different, second ratio of pedal stroke movement relative to cable stroke movement upon further depression of the accelerator pedal.

14. The method of claim 13 further including providing a greater ratio of pedal stroke movement relative to cable stroke movement during the initial depression of the accelerator pedal than later in the pedal stroke movement between the first and second ratios.

15. The method of claim 11 further including forming the accelerator pedal as a one-piece component without moving linkages.

* * * * *